(12) United States Patent
Faraj

(10) Patent No.: US 11,307,554 B2
(45) Date of Patent: Apr. 19, 2022

(54) SYSTEM AND METHOD FOR KEYWORD-BASED PLC PROGRAMMING

(71) Applicant: Younes Faraj, Calgary (CA)

(72) Inventor: Younes Faraj, Calgary (CA)

(*) Notice: Subject to any disclaimer, the term of this patent is extended or adjusted under 35 U.S.C. 154(b) by 282 days.

(21) Appl. No.: 16/689,271

(22) Filed: Nov. 20, 2019

(65) Prior Publication Data

US 2021/0149362 A1   May 20, 2021

(51) Int. Cl.
*G05B 19/05* (2006.01)

(52) U.S. Cl.
CPC .. *G05B 19/056* (2013.01); *G05B 2219/13004* (2013.01)

(58) Field of Classification Search
USPC .......................................................... 700/86
See application file for complete search history.

(56) References Cited

U.S. PATENT DOCUMENTS

| | | | |
|---|---|---|---|
| 5,237,652 A | 8/1993 | McManus | |
| 7,324,856 B1 | 1/2008 | Bromley | |
| 7,433,752 B2 | 10/2008 | Eimann et al. | |
| 8,898,633 B2* | 11/2014 | Bryant | G05B 19/056 717/120 |
| 9,110,653 B2 | 8/2015 | Canedo et al. | |
| 9,494,926 B2* | 11/2016 | Frazer | G06F 11/2005 |
| 9,606,776 B2 | 3/2017 | Osakabe | |
| 2014/0046457 A1* | 2/2014 | Taber | G05B 19/056 700/2 |
| 2015/0286204 A1* | 10/2015 | Yamaoka | G05B 19/056 700/86 |
| 2017/0017221 A1* | 1/2017 | Lamparter | G05B 19/056 |
| 2018/0224820 A1* | 8/2018 | Jiang | G05B 19/05 |
| 2018/0314225 A1* | 11/2018 | Bisse | G05B 19/05 |
| 2019/0121816 A1 | 4/2019 | Sasaki et al. | |
| 2020/0218220 A1* | 7/2020 | Stark | G06F 8/41 |

FOREIGN PATENT DOCUMENTS

| | | |
|---|---|---|
| CN | 103235549 B | 9/2015 |
| DE | 102011117758 A1 | 5/2013 |
| EP | 2787403 A1 | 10/2014 |
| JP | 2015053022 A | 3/2015 |

* cited by examiner

*Primary Examiner* — Md Azad
(74) *Attorney, Agent, or Firm* — Orin Del Vecchio

(57) ABSTRACT

The present invention relates to generally to programmable logic controllers (PLCs), and more particularly to a system and method to enables a user to accelerate the generation of PLC programs. The system includes a set of specific keywords and an internal algorithm that in combination with the industrial process information provided by the user, creates a methodology for PLC program generation, which is flexible enough to adapt to the user, PLC programming strategies, and other standards and practices.

16 Claims, 2 Drawing Sheets

SYSTEM AND METHOD FOR KEYWORD-BASED PLC PROGRAMMING

FIELD OF THE INVENTION

The present specification relates generally to programmable logic controllers (PLCs), and more particularly to a system and method of programming PLCs using keywords.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

Programmable Logic Controllers (PLCs) are used extensively across many industries to monitor and control process. For example, PLCs may be used to control the operation of valves and pumps in a water treatment plant and to monitor various status conditions (water flow, water pressure, temperature, etc.) The use of PLCs allows for the interactions between controlled devices and their operating environment to be more easily centralized and controlled.

However, the actual programming of PLCs is known as a difficult and time-consuming task. Information about the industrial process to be controlled, the operating parameters and the control narrative for the devices must be gathered and converted into one or more programs that are then entered into the PLCs. As a consequence, most PLC programs are created manually by a highly skilled individual, typically an automation engineer, or a specialist PLC programmer. However, this method of programming presents limitations, including being time-consuming, and requires intensive effort to validate the PLC program(s) once created since the risk of human error when using such a method is very high. Lastly, future modification or expansion of the PLC programs can be very difficult if the original programmer is no longer available, as the custom programs often lack both internal and cross-program consistency in structure and terminology.

Therefore, it would be desirable to have a system and method for programming PLCs which mitigates some of the disadvantages created by generating PLC programs manually. Preferably, such a system would additionally provide for reduced time and increased efficiency in programming, as well as not limiting the user into using specific programming standards or practices.

Accordingly, there remains a need for improvements in the art.

SUMMARY OF THE INVENTION

In accordance with an aspect of the invention, there is provided a system and method of programming PLCs using keywords.

According to an embodiment of the invention, there is provided a computer-implemented method of programming one or more Programmable Logic Controllers (PLCs) using keywords to generate a PLC program, comprising: receiving a device list, the device list comprising a list of devices to be controlled and/or monitored by the PLCs; receiving a cause and effect list, the cause and effect list generated from a control narrative for the PLCs; applying a control algorithm to assign one or more controls to each of the devices on the device list according to the cause and effect list, each of the one or more controls defined by one or more keywords from a keyword database, the control algorithm using one or more of: an internal programming model, a user-provided custom programming model, and a combination thereof; generating a control logic from the control algorithm; generating the PLC program from the control logic and the keywords; and outputting the PLC program as a file, wherein the PLCs are used in a process-based operation.

The method may further comprise the generation of the control logic from a cause and effect list. Optionally, the cause and effect list may be produced from a template generated from the device list.

Other potential features may include implementing an alarm list comprising a set of alarms and conditions for triggering the alarms and storing custom programming models as internal programming models for future use.

According to a further embodiment of the invention, there is provided a system for executing the method. The system comprises a user interface, the user interface coupled to a display; and a PLC program generator, the PLC program generator coupled to the user interface and the display, the PLC operative to generate a PLC program via: receiving a device list, the device list comprising a list of devices to be controlled and/or monitored by the PLCs; receiving a cause and effect list, the cause and effect list generated from a control narrative for the PLCs; applying a control algorithm to assign one or more controls to each of the devices on the device list according to the cause and effect list, each of the one or more controls defined by one or more keywords from a keyword database, the control algorithm using one or more of: an internal programming model, a user-provided custom programming model, and a combination thereof; generating a control logic from the control algorithm; generating the PLC program from the control logic and the keywords; and outputting the PLC program as a file. The user interface and display are operative to enable a user to monitor and modify the PLC program generator during PLC program generation.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and

DETAILED DESCRIPTION

Other aspects and features according to the present application will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example only, embodiments of the invention, and how they may be carried into effect, and in which.

Like reference numerals indicated like or corresponding elements in the drawings.

DETAILED DESCRIPTION OF THE EMBODIMENTS

The present invention relates to generally to programmable logic controllers (PLCs), and more particularly to a system and method of programming PLCs using keywords.

Figure 1:
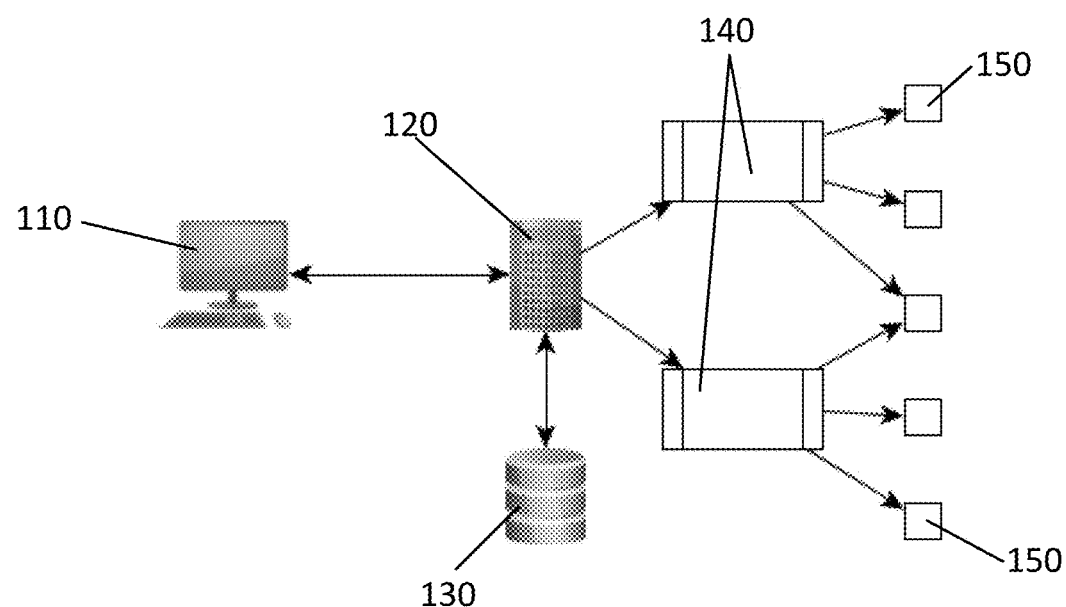
FIG. 1 is a block diagram of an operating environment for the system according to an embodiment.

According to an embodiment as shown in FIG. 1, a block diagram for a system for programming programmable logic controllers (PLCs) is shown. The system may include a user interface 110 to enable a user to access the system server 120. Either of both of the user interface or the server 120 may further include plurality of standard operational components, such as an input/output interface and a read/write interface. The system may further include a set of databases 130, the primary databases comprising a keyword database which contains the keywords used by the system to generate the PLC programs and an internal algorithm database containing a set of internal algorithms. Additional databases may include a project database containing a set of user projects (i.e. I/O Lists), a cause and effect database containing a set of cause and effect parameters to apply to devices, a device database containing a set of device lists (i.e. controlled devices), and an alarm database containing a set of alarms and alarm conditions to be applied.

The system further comprises a PLC program generator, the PLC program generator using one or more programming models to assign controls to devices and generating the PLC program using keywords from the keyword database and the assign controls. The generated PLC program may then be output as file and transferred to an end user for use in programming to one or more PLCs 140.

The PLCs 140 then act to monitor and control one or more connected devices 150 in accordance with the PLC program. The system may operate to generate programs for multiple PLCs either sequentially or simultaneously, depending on how many different devices, PLCs and PLC programs are required.

Operationally, user interface 110, server 120, and databases 130 may be connected locally or remotely, in any combination. Similarly, server 120 may be connected locally or remotely to PLCs 140. Local connections may be hardwired (e.g. Ethernet), while remote connections may be direct (wireless, Bluetooth, etc.) or indirect via the Internet or a similar cloud-based connection.

Figure 2:
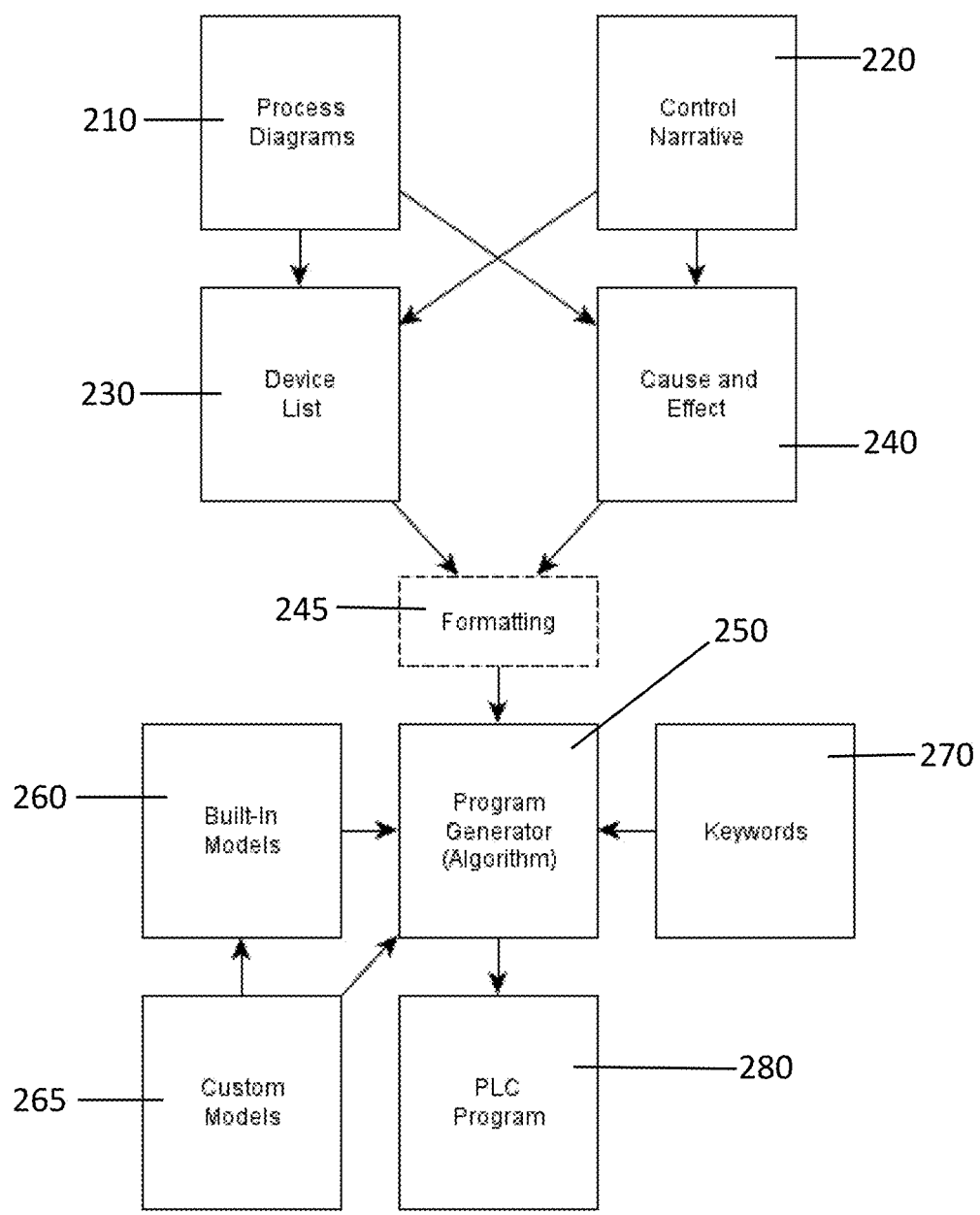
FIG. 2 is a block diagram of the process according to an embodiment.

Referring to FIG. 2, a block diagram for executing the method of generating the PLC program is shown. The initial inputs are the process diagrams 210 which define the processes being controlled by the PLCs, and the control narrative 220 which defines the parameters (values) used within the process (e.g. shutdown values, alarm triggers). From the process diagrams 210 and control narrative 220, a device list 230 is created, which is a list (e.g. spreadsheet) of all the devices that are to be controlled (by PLCs) according to the process diagrams 210 and control narrative 220. Additionally, a cause and effect list 240 is also created, which is a list (e.g. spreadsheet) of all the inputs and outputs to the devices in the device list, again according to the process diagrams 210 and control narrative 220.

The device list 230 and cause and effect list 240 are then input into the program generator 250 in order to generate the program for the PLCs. If necessary, there may be a formatting step 245 required in order to convert the device list 230 and cause and effect list 240 into a format which is understood by the program generator. At this stage, any duplicate elements (device, tags, descriptions, etc.) may be flagged by the system and highlight to the user for correction. Additionally, the user may manually input any other corrections or updates if necessary.

The program generator then receives the models required to generate the program and applies a control algorithm. A set of built-in models 260 are provided by the system to create a control logic from the cause and effect list 240 which is then combined with a set of keywords 270 from a keyword database according to the control algorithm, generating a program with a consistent structure and set of defined functions and parameters according to the keywords. If required, one or more custom models 265 may be provided by the user and also applied to generate the control logic. If used, the custom models 265 may then be migrated and stored as new built-in models 260 for potential future use.

Once generated, the PLC program 280 may be validated with minimal effort before transferring it to the end user for entering into the PLC using the end user software. If desired, the PLC program may be virtualized using the end user software to verify operation prior to being output. If any deficiencies are spotted in virtualization, the user may act to correct them, and re-verify. Also, corrections may be back ported to the programming models, if required.

The PLC program 280 may then output as a file, the file capable of being used to program one or more PLCs as required by the control narrative 220. Where multiple PLC programs are required, the process may take place either sequentially or simultaneously, again depending the requirements, processing power of the system, and bandwidth of the connections between the system and the end users.

Advantageously, once the program is generated, the program file may be rapidly output to the end user for programming the PLCs as described above but may also be exported to other end users to program other PLCs through other systems. For example, in a water treatment plant, a program may be generated for the PLCs which control the tank valves for a treatment tank. Once completed, the program may then be applied to additional treatment tanks, and, if necessary, to other plants. Furthermore, if any future changes or modifications are required, the keyword-based system allows users at any site to review and modify the program, which may then be rapidly redistributed according to the same process.

Additional elements may also be incorporated into the program. One such element is alarms. An alarm list may be provided, in the same manner as the device list and cause and effect list, the alarm list (e.g. spreadsheet) containing one of more alarms associated to the devices on the device list. From there, the alarm list may be incorporated into the program, using keywords from the keyword database to provide consistent structure and language. Accordingly, the alarms can then be pushed out to the devices and may be monitored and updated similarly to other parameters. Again, the use of keywords allows for ease of use in future reference and updates over custom programs. Other parameters and conditions (e.g. shutdown conditions) may be provided and incorporated into the program in the same manner.

Furthermore, if desired, parameters may be modified in real time either as part of a virtualization or while in operation on a PLC. Accordingly, changes may be tracked in real time and their effect noted. Any modifications which are then deemed to be permanent may then be rolled back into the program and pushed out (or back out) to the PLC. This process may also lead to the creation of custom programming models as described above which, once implemented, may be stored as built-in programming models for future use and reference.

As an example, consider a process to monitoring pressure and temperature in a tank. The range of temperatures and pressures to trigger the alarm (e.g. pressure between 500 kPa to 700 kpa, temperature between −20 and +40). The program may be initially generated with generic alarms using keywords for pressure and temperature, and then modified by the cause and effect parameters for the desired trigger value. Once the program is loaded to the PLC can, the parameters may be read in real time and modified if necessary. The final operating parameters may then be exported, either as parameters alone or as the entire program, and pushed out to one or more additional PLCs in a single step. Alternatively, the exported parameters/program may be modified again prior to being used to program additional PLCs.

It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description and all changes which come within the meaning and range of equivalency of the claims are therefore intended to be embraced therein.

What is claimed is:

1. A computer-implemented method of programming one or more hardware Programmable Logic Controllers (PLCs) using keywords to generate a PLC program for the one or more PLCs, comprising:
   receiving a device list, the device list comprising a file containing a list of devices to be controlled and/or monitored by the PLCs;
   receiving a cause and effect list, the cause and effect list comprising a file generated from a control narrative for the PLCs, the control narrative comprising one or more parameters used within a process controlled by the PLCs;
   applying a control algorithm to assign one or more controls to each of the devices on the device list according to the cause and effect list, each of the one or more controls defined by a keyword from a keyword database of keywords, each keyword based on a fixed internal algorithm, the control algorithm using a combination of an internal programming model created from one or more of the keywords, and a user-provided custom programming model, created from user-selected keywords;
   generating a control logic for the PLCs from the control algorithm;
   generating the PLC program via a PLC program generator, the PLC program generator combining the control logic and the keywords to generate the PLC program in a PLC programming language; and
   outputting the PLC program as a file, the file usable to program the PLCs,
   wherein the PLCs are used in a process-based operation.

2. The method of claim 1, wherein the cause and effect list is created from a template, the template being generated from the device list.

3. The method of claim 1, further comprising an alarm list, the alarm list comprising a set of alarms and conditions for triggering the alarms.

4. The method of claim 1, wherein the user-provided custom programming model is subsequently stored as an internal programming model for future use.

5. The method of claim 1, wherein multiple PLC programs are generated simultaneously.

6. The method of claim 1, wherein multiple PLC programs are generated sequentially.

7. The method of claim 1, further including a step of formatting one or both of the device list and the cause and effect list into a format readable by the control algorithm.

8. The method of claim 1, wherein the control algorithm may be applied to a PLC while the PLC is in operation.

9. A system for programming one or more hardware Programmable Logic Controllers (PLCs) using keywords to generate a program for the PLCs, the system comprising a server to implement:
   a user interface, the user interface coupled to a display; and
   a PLC program generator running on a computing device accessible through the user interface, the PLC program generator coupled to the user interface and the display, the PLC program generator operative to generate a PLC program via:
   receiving a device list, the device list comprising a file containing a list of devices to be controlled and/or monitored by the PLCs;
   receiving a cause and effect list, the cause and effect list comprising a file generated from a control narrative for the PLCs, the control narrative comprising one or more parameters used within a process controlled by the PLCs;
   applying a control algorithm to assign one or more controls to each of the devices on the device list according to the cause and effect list, each of the one or more controls defined by one or more user-selected keywords from a keyword database of keywords, the control algorithm using a combination of an internal programming model, and a user-provided custom programming model, with the user-selected keywords;
   generating a control logic for the PLCs from the control algorithm;

generating the PLC program within the PLC program generator by combining the control logic and the keywords; and outputting the PLC program as a file, the file usable to program the PLCs, wherein the user interface and display are operative to enable a user to monitor and modify the PLC program generator during PLC program generation.

10. The system of claim 9, further comprising a template generator, the template generator operative to create a template from the device list, the created template used to create the cause and effect list.

11. The system of claim 9; further comprising an alarm list, the alarm list comprising a set of alarms and conditions for triggering the alarms.

12. The system of claim 9, wherein the user-provided custom programming model is subsequently stored as an internal programming model for future use.

13. The system of claim 9, wherein the PLC program generator is capable of generating multiple PLC programs simultaneously.

14. The system of claim 9, wherein the PLC program generator is capable of generating multiple PLC programs sequentially.

15. The system of claim 9, further including formatting one or both of the device list and the cause and effect list into a format readable by the control algorithm.

16. The system of claim 9, wherein the control algorithm may be applied to a PLC while the PLC is in operation.

* * * * *